United States Patent [19]

Cobile

[11] Patent Number: 5,435,118
[45] Date of Patent: Jul. 25, 1995

[54] VACUUM SWEEPER SHREDDER ROTARY MOWER

[76] Inventor: Alfredo P. Cobile, 94-179 Awaia St., Waipahu, Hi. 96797

[21] Appl. No.: 241,781

[22] Filed: May 12, 1994

[51] Int. Cl.$^6$ .................. A01D 34/67; A01D 34/72; A01D 37/73
[52] U.S. Cl. ..................... 56/13.4; 56/16.9; 56/17.5; 56/255; 56/320.2
[58] Field of Search ............. 56/11.6, 13.4, 16.6, 56/16.9, 17.5, 255, 320.2

[56] References Cited

U.S. PATENT DOCUMENTS

| Re. 29,139 | 2/1977 | Messner | 56/13.4 X |
|---|---|---|---|
| 3,118,267 | 1/1964 | Shan | 56/320.2 X |
| 3,657,865 | 4/1972 | Ober | 56/320.2 X |
| 3,783,592 | 1/1974 | Schraut | 56/16.9 X |
| 3,802,171 | 4/1974 | Cousino | 56/13.4 |
| 3,828,533 | 8/1974 | Finneran | 56/320.2 |
| 4,996,829 | 3/1991 | Saitoh et al. | 56/16.6 X |
| 5,020,309 | 6/1991 | Hopkins | 56/16.6 X |
| 5,040,360 | 8/1991 | Meehleder | 56/11.6 |
| 5,142,851 | 9/1992 | Lydy et al. | 56/13.4 |
| 5,240,188 | 8/1993 | Whitmire | 241/29 |

Primary Examiner—George A. Suchfield

[57] ABSTRACT

This invention is an improvement of the vertical shaft rotary lawn mower so that it can, besides cut grass, also vacuum and sweep lawns, driveways, and other hard-surfaced areas and to shred leaves and other shreddable materials. The improvement includes a rotatable sweeper brush in its own housing, a shredder with a number of uniformly twisted angularly radiating blades, and an inverted truncated conically shaped blower. Both shredder and blower are attached respectively near the top extremity and to the lower extremity of a rotatable spindle. In the sweeping and/or vacuuming operation, the sweeper brush, the spindle, the blower, and the mower blade revolve and leaves and other debris are sucked up into the brush housing by the rotating brush and by the rushing air, torn into small pieces by the revolving shredder, and the debris thrown upwardly sideward by the blower into the upper corner above the baffles, whirled, and thrown upward into the discharge chute and into the grass bag. In the grass cutting function, the grass clippings produced by the mower blade are thrown upward against the underside of the baffles, flow inclining upward into the upper corner of the mower chamber above the baffles, whirled and blown through the discharge chute into the grass bag.

15 Claims, 3 Drawing Sheets 5,435,118

VACUUM SWEEPER SHREDDER ROTARY MOWER

BACKGROUND OF THE INVENTION

1. Field of the Invention

This invention generally relates to yard machines. More particularly, this invention relates to rotary lawn mower that is improved by giving it the capabilities to sweep, vacuum, and shred in addition to cutting grass.

2. Description of the Prior Art

Yard machines of many styles and uses have long been invented such as mowers, sweepers, vacuums, shredders, chippers, and trimmers. Mowers are of the reel and rotary types, electric motor or engine-driven, walk behind or riding kind. Sweepers are also walk behind, engine-driven, and riding kind and just for sweeping. Machines are designed to vacuum, shred, and chip such as that which we can see in that Troy-bilt vacuum shredder, chipper manufactured by Garden Way Incorporated. A lawn mower was designed to cut grass, sweep lawn, and blow snow such as that of U.S. Pat. No. 4,046,679 to David Spinner. Another multifunction machine wich can cut grass mulch, and collect the debris it produces is described in U.S. Pat. No. 4,411,124 to Hubert E. Strickland. A machine that can sweep and collect debris only is described in U.S. Pat. No. 3,849,043 to Charles W. Doering. A self-propelled lawn vacuum, mower and sweeper having interchangeable reel type and rotary brush units, both feeding material tangentially toward the intake of the vacuum can be seen in U.S. Pat. No. 3,783,592 to Karl Schraut.

SUMMARY OF THE INVENTION

Accordingly, it is an object of this invention to provide additional functions to a walk behind rotary mower in addition to what it is originally designed to do; that is, to cut grass.

More particularly, it is an object of this invention to add to the walk behind rotary lawn mower the functions to vacuum and sweep a lawn, driveway, any paved, concreted, or hard-surfaced area, or an area covered with artificial turf provided that there is no loose yarn or carpet thread which the mower blade can catch or which can wrap around the revolving sweeper brush.

Further, it is an object of this invention to add to the walk behind rotary mower the function to shred leaves and debris taken in by the mower during its vacuuming and sweeping operation.

In keeping with these objects and with others which will become apparent hereinafter, one feature of the present invention is that it includes a T-shaped sweeper brush housing with its cross part parallel to and in front of the mower housing, and the open tail end of said brush housing penetrating the rectangular aperture in the engine pedestal. Said tail end of said T-shaped brush housing is hinged to the lower side of the rectangular aperture in the engine pedestal to allow the front part of the brush housing to slightly move up and down as the vacuum sweeper shredder rotary lawn mower is pushed over uneven ground. A cleanout door is provided on the top side of the tail end of the brush housing for clearing said tail end and the interior of the engine pedestal of clogging leaves and debris.

Another feature of the present invention is that it includes a cylindrical sweeper brush which rotates inside the brush housing; said sweeper brush has a number of straight or spiraling rows of stiff bristles. Further, said-sweeper brush is rotated by a belt from a worm gear which is rotated by a belt from the engine shaft.

Another feature of the present invention is that it includes a worm gear whose worm is belt-driven by the motor or engine, and a pulley attached to the shaft of the gear in which rides a belt that drives the pulley attached to the left shaft of the sweeper brush.

Still another feature of the present invention is that it includes a linkage mechanism which can raise or lower the front part of the brush housing by pulling or pushing the knobbed lever on the mower handle.

Still another feature of the present invention is that it includes a spindle co-axially attached and keyed to the engine crankshaft at the top of which spindle is a pulley belted to drive the worm gear, and a flange right next and below the said pulley to which is attached the shredder.

Yet another feature of the present invention is that it includes a cylindrical pedestal on which the engine sits and which pedestal has a circular bottom plate to the center of which the spindle bearing holder is fixed. Said circular bottom plate is provided with two fan-shaped holes through which the debris cut up by the shredder blades pass. Said pedestal is also the shredder housing.

Yet another feature of the present invention is that it includes a shredder made up of a number of cutting blades uniformly twisted and equally spaced and arranged in a conical configuration with the upper ends of the blades attached fixedly to a circular plate that is bolted to the flange on the spindle. Said twist in the cutting blades of the shredder helps to produce a low pressure inside the tail end of the sweeper brush housing.

Still another feature of the present invention is that it includes a blower shaped like an inverted truncated cone to which are fixed impeller blades shaped and formed to cause air and debris to be blown at a high centrifugal velocity into the upper corner above the inclining baffles around the mower housing interior. Said blower, in conjunction with the shredder, produce a-vacuum inside the sweeper brush housing thereby causing air in front of the sweeper brush housing to rush into the interior of the mower housing.

Yet another feature of the present invention is that it includes baffles or strips of metal of a certain length and width which are welded or fixedly attached around and inside the vertical cylindrical wall of the mower housing. These baffles are for the purpose of preventing debris coming from the sweeper brush housing from being blown downward, under, and out of the lower rim of the mower chamber.

Still another feature of the present invention is that it includes a set of idler pulleys on which rides the belt that drives the pulley on the brush axle. These pulleys keep-the belt aligned at all times with the gear and brush pulleys when the brush housing is raised, during which time, the belt is loose on its pulleys. The belt is taut when the front part of the brush housing is at its downmost position.

And still another feature of the present invention is that it includes a discharge chute which provides a passageway for air and debris to flow from inside the mower housing into the grass catcher.

Still another feature of the present invention is that it includes a roller of appropriate diameter attached to tabs extending rearward on each end of the cross part of the sweeper brush housing, and which roller prevents air from behind it and to get inside the brush housing. This roller also follows the contour of the ground and makes the brush housing move up and down accordingly.

Another feature of the present invention is that it includes a strip of flexible rubber attached to the inside lip of the brush housing; said rubber strip glides over the grass or on the surface of the ground preventing leaves and debris to get under it and run over by the roller.

The features mentioned above, the construction, and advantages over the other multi-function yard machines will become more apparent and will be further understood by referring to the following description of the specific embodiments of the invention when read in conjunction with the accompanying drawing.

LIST OF REFERENCE NUMERALS UTILIZED IN THE DRAWING

Figure 1:
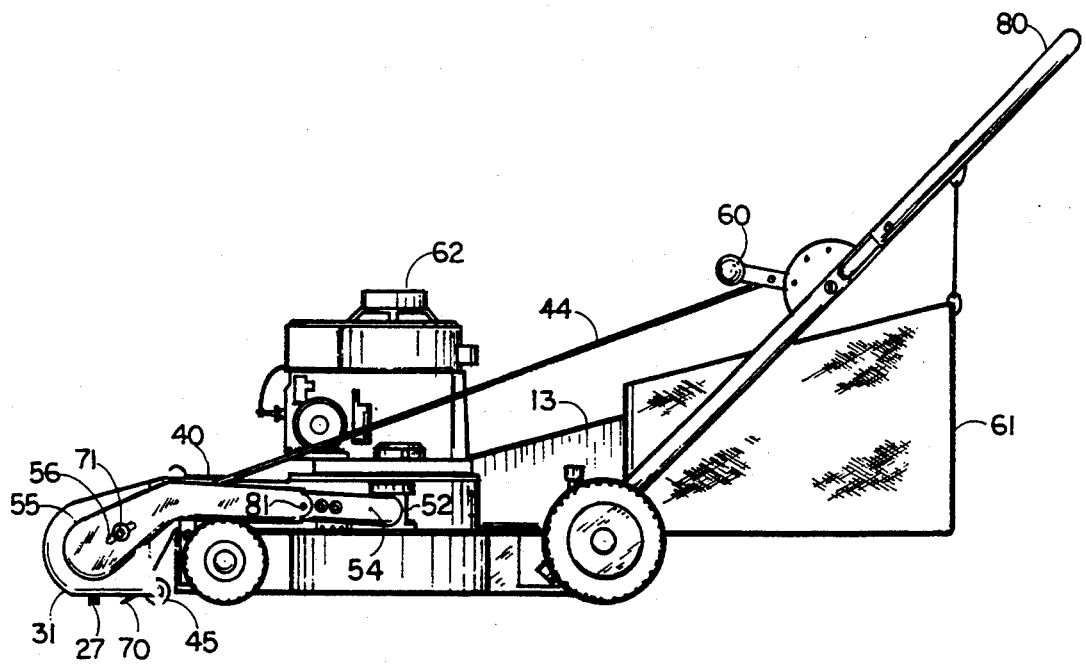
FIG. 1 is a side view of the invention
Figure 2:
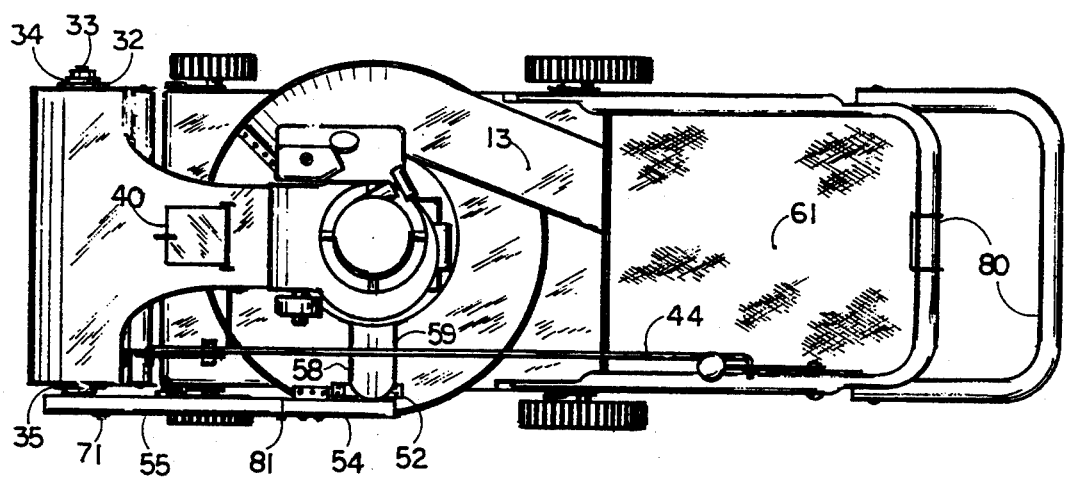
FIG. 2 is a top view of the invention
Figure 3:
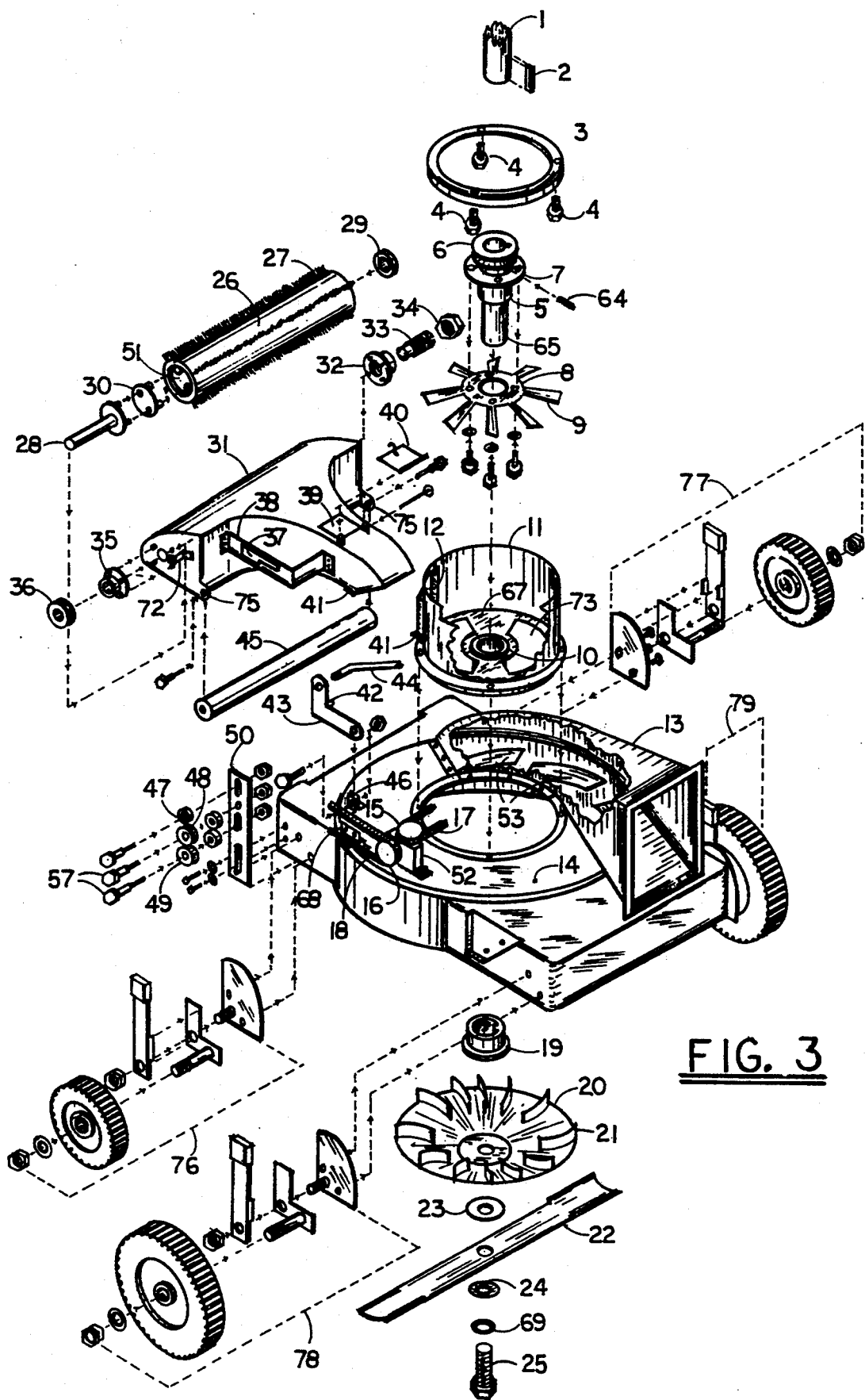
FIG. 3 is an exploded view of the invention with part of the engine pedestal and the discharge chute cut away
Figure 4:
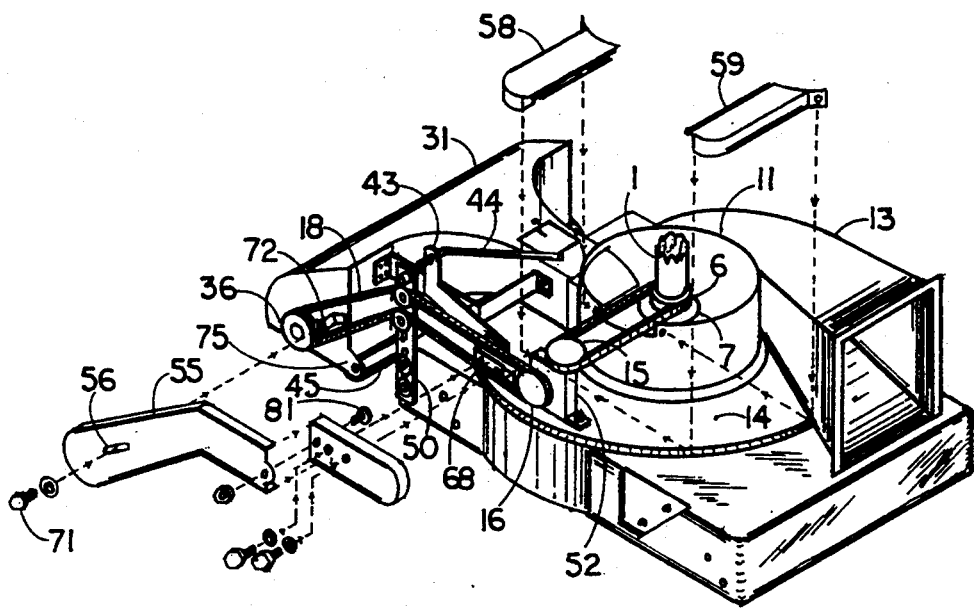
FIG. 4 is a partial diagramatic perspective showing the brush housing, the discharge chute, and the belt and pulley system
Figure 5:
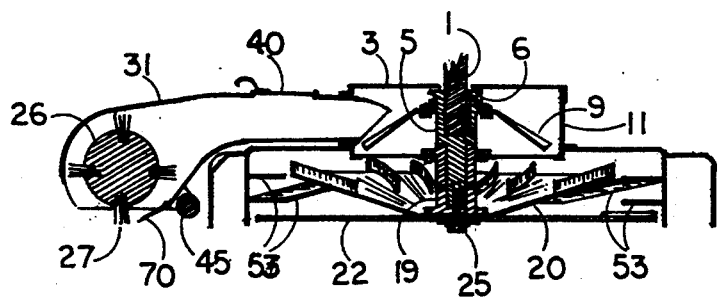
FIG 5 is a cross section view showing brush, shredder, blower, baffles, etc.
Figure 6:
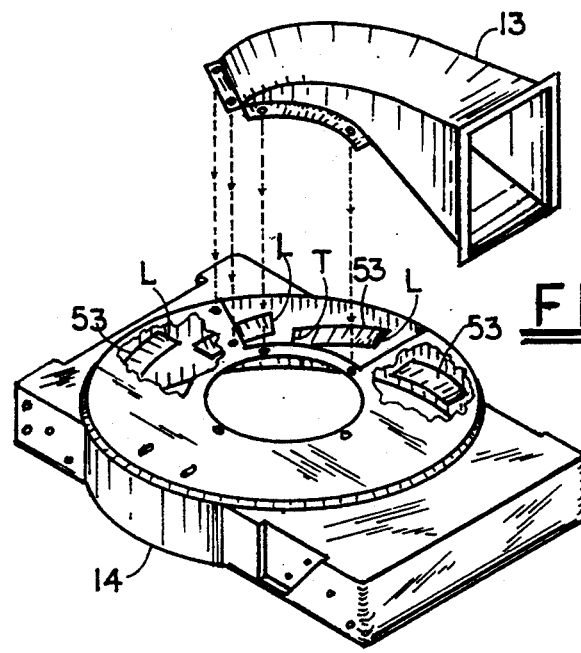
FIG. 6 is a perspective exploded view of the discharge chute and the mower housing cut away to show the baffle arrangement

1 - Crankshaft, engine
2 - Key
3 - Engine base adapter
4 - Adapter bolts
5 - Spindle
6 - Pulley (on spindle)
7 - Flange (on Spindle)
8 - Shredder
9 - Shredder blades
10 - Bearing holder
11 - Engine pedestal
12 - Aperture, pedestal
13 - Discharge chute
14 - Mower housing
15 - Pulley (worm)
16 - Pulley (gear)
17 - Belt (Engine to worm)
18 - Belt (Worm gear to brush pulley)
19 - Adapter
20 - Blower
21 - Impeller (blower)
22 - Mower blade
23 - Big washer
24 - Belleville washer
25 - Bolt
26 - Brush
27 - Bristles (brush)
28 - Left shaft (brush)
29 - Bearing (Brush)
30 - Rubber damper
31 - Sweeper brush housing
32 - Right shaft holder
33 - Right shaft
34 - Shaft lock nut
35 - Left shaft bearing
36 - Pulley (Brush)
37 - L-shaped slot
38 - Bracket (brush housing lifter)
39 - Cleanout opening
40 - Cleanout door
41 - Hinge
42 - Pin, L-shaped lever
43 - L-shaped lever
44 - Rod, brush housing lifter
45 - Roller
46 - Bracket for L-shaped lever
47 - Sleeve roller
48 - Idler pulley (V)
49 - Idler pulley (Plain)
50 - Bracket for Idler pulleys
51 - Recess for rubber damper
52 - Worm gear
53 - Baffles
54 - Belt cover (Fixed)
55 - Belt cover (Movable)
56 - Slotted hole on movable belt cover
57 - Idler pulley bolts
58 - Half belt cover (Belt 17)
59 - Half belt cover (Belt 17)
60 - knob handle
61 - Grass bag
62 - Engine or motor
64 - Set screw, spindle
65 - Keyway, spindle
66 - Pin, cleanout door
67 - Pedestal bottom
68 - Bracket for belt cover 54
69 - Washer, blade bolt
70 - Rubber strip, brush housing
71 - Bolt, movable belt cover
72 - Bracket, movable belt cover
73 - Fanlike opening, pedestal bottom
74 - Debris exit hole on mower deck
75 - Tab, brush housing roller
76 - Left front wheel assembly
77 - Right front wheel assembly
78 - Left rear wheel assembly
79 - Right rear wheel assembly
80 - Mower handle (Two-piece)
81 - Pivot bolt for belt cover
L - Leading end of baffles
T - Trailing end of baffles

DESCRIPTION OF THE PREFERRED EMBODIMENTS

With continuing reference to the drawings wherein the elements are identified by a respective number, the description of the elements may be according to the following.

The power that drives the sweeper brush 26, shredder 8, blower 20, and mower blade 22 comes from an electric motor or vertical shaft gasoline engine 62. It is provided with a circular adapter 3 having an L-shaped crossection whose top part is provided with holes for attaching to the base of engine 62 by bolts 4. The vertical part of adapter 3 is also provided with holes that match the holes near the upper edge of pedestal 11.

Discharge chute 13 has a hollow rectangular and decreasing crossection size, sides curving from its intake end toward the rear and with its top surface slanting upward toward its outlet. It is provided with means for attaching to the top of mower housing 14 in such a way that the intake end of discharge chute 13 is wholly over the exit hole 74 on the top wall of mower housing 14, providing a passageway for the debris from the mower chamber to the grass bag attached to the outlet end of discharge chute 13.

The pedestal 11, cylindrical and hollow, has its outside diameter equal to the diameter of the centrally located opening on the top wall of the mower housing 14. At the lower end of the pedestal is a bottom plate 67 with fan-shaped openings 73 through which shredded debris pass on down into the mower chamber where blower 20 revolves. A flange plate is attached fixedly around pedestal 11 a short distance from the lower end. The pedestal 11 is bolted onto the mower housing 14 by inserting the lower end of pedestal 11 until the flange sits on the edge of the circular opening on the top wall of mower housing 14. Further, pedestal 11 is provided with a rectangular aperture 12 whose dimensions are a trifle larger than the crossection dimensions of the tail end of the T-shaped sweeper brush housing 31. This aperture 12 is provided with a hinge means for attaching the tail end of the sweeper brush housing 31 to the pedestal 11 with the tail end penetrating into the aperture 12 in pedestal 11. Ninety degrees to the left of aperture 12 and near the top of pedestal 11 is a window for belt 17 to pass through.

Sweeper brush housing 31 is shaped somewhat like a T having a cross part and a tail part. The cross part contains the sweeper brush 26 at the right end of which houses bearing 29 and which revolves on shaft 33 screwed to the right shaft holder 32 and locked fixedly by lock nut 34. The left end of brush 26 is provided with a rubber damper 30 having protrusions that go into corresponding holes inside recess 51. Rubber damper 30 is also provided with holes into which corresponding protrusions on the flange end of left shaft 28 fit in. Left shaft 28 rotates inside bearing 35 which is removably attached to the left lateral end of sweeper brush housing 31; further a V-belt pulley 36 is attached keyed or set screwed to the outer end of shaft 28.

Further, the front lip of sweeper brush housing 31 is more above ground than the rear lip of housing 31, so that the leaves can be easily sweeped up into the space above sweeper brush 26. A strip of rubber 70 is attached to the inner side of the rear lip of the sweeper brush housing 31. Extending rearward is a tab 75 on each lateral end of the cross part of the brush housing 31 which tabs provide attaching means for roller 45 which roller is always in contact with the ground when the machine is in the sweeping and vacuuming mode.

On the top side and near the tail end of sweeper brush housing 31 is an opening provided with a spring loaded door for clearing the sweeper brush housing when it is clogged up with leaves and debris. The spring is for keeping the door shut at all times.

Shredder 8, blower 20, and mower blade 22 are all attached to spindle 5 at the top end of which is a V-belt pulley 6 and a flange 7 a short distance below pulley 6. A blind hole with the same diameter as that of the crankshaft 1 of engine 62 is bored through the axis of spindle 5. Crankshaft 1 of engine 62 is inserted into this blind hole and prevented from spinning inside the hole by a rectangular key 2 and set screw 64. About half the length of the spindle 5 is bigger in diameter than the lower half, and this lower half fits in the bearing in bearing holder 10 removably attached to the center of the bottom 67 of pedestal 11. The lower end of spindle 5 has a keyway 65 for the built-in key in blade adapter 19.

Shredder 8 has a number of blades 9 radiating from a circular center. Each blade has its leading edge sharpened and bent downward to form a conical configuration. Further, the blades 9 are given a uniform twist so that when shredder 8 revolves, it blows air and debris downward through the fan-shaped holes 73 in bottom 67 of pedestal 11.

The body of blower 20 is in the form of an inverted truncated conically shaped plate to whose inside surface and extending up to the rim are attached fixedly short radiating blades 21 shaped and sized to give maximum blowing effect. When installed, the periphery of the blower's plate has its plane coplanar with the plane of the leading ends L of baffle 53 and said periphery of the blower plate has some clearance with the inside corner of the baffles leading ends.

A V-belt 17 connects pulley 6 of spindle 5 to the pulley 15 attached to the worm that turns a gear inside the worm gear housing 52 which is removably and adjustably attached to the top side of the top wall of mower housing 14. Belt 17 passes through the rectangular window in pedestal 11. To the shaft of the driven gear is attached pulley 16 that drives pulley 36 on shaft 28 by V-belt 18. Tension on belt 18 is adjusted by adjusting idler pulleys 48 and 49 both adjustably screwed to bracket 50 which is adjustably attached to the side of the forward continuation of mower housing 14.

Half covers 58 and 59 join together to cover belt 17 and pulley 15. When screwed to pedestal 11, this belt and pulley cover prevents much air from leaking into the pedestal chamber. The cover for V-belt 18 and pulleys 16 and 36 consists of two pieces, cover 54 and cover 55 joined together by pivot bolt 81. Cover 54 is bolted to bracket 68 attached to the top of mower housing 14. Cover 55 is attached to bracket 72 by bolt 71 through slotted hole 56.

The assembly to lift or lower the front of brush housing 31 consists of L-shaped bracket 38, L-shaped lever 43, rod 44, bracket 46, and lever handle 60. L-shaped bracket 38 has an L-shaped slot on that leg that is attached fixedly to the left rear side of the cross part of the T-shaped sweeper brush housing 31, while the other leg of the same bracket 38 is attached to the left side of the tail part of sweeper brush housing 31. Bracket 46 is fixedly attached to the top wall of mower housing 31. L-shaped lever 43 has a fixed pin 42 on the side near the corner of its legs. Handle 60 is a flat lever that rotates on a fulcrum that is a bolt that attaches the lever to a semi-circular plate with semi-circularly arranged holes into any of which holes a fixed pin on the lever handle goes in to lock the handle. The same bolt attaches both lever and plate to the mower handle 80.

Baffles 53 are of a certain width and arc length and are fixedly attached around and inside the vertical wall of the cylindrical part of mower housing 14. All the leading ends L of baffles 53 lie in the same plane below the top wall of mower housing 14, while all the trailing ends T of baffles 53 lie in another plane parallel to and below the plane of the leading ends L, giving each baffle a certain angle of inclination. The trailing end T of a baffle and the leading end L of the next or following baffle are at a certain horizontal and vertical distance from each other, thereby giving space for the grass clippings to pass between the baffle ends.

Again with continuing reference to the drawings, the procedure of assembling the elements may be according to the following:

Discharge chute 13 is positioned on the deck of mower housing 14 in such a way that the intake hole of chute 13 coincide with the discharge hole 74 on mower housing 14, and also that the corresponding bolt holes in both chute 13 and mower housing 14 are matched. Then pedestal 11 is positioned over the center hole of mower housing 14 with the aperture 12 facing front and bolted tight to mower housing 14.

Worm gear 52 is bolted temporarily and a little loosely to the mower deck to allow for belt tension adjustment later on. The bracket 50 is bolted to the front left side of mower housing 14; the slotted holes in bracket 50 allows for-adjustment of said bracket so that belt 18 will be most tight when brush housing 31 is at its downmost position, but not too tight as to prevent roller 45 from touching the ground. Idler pulleys 48 and 49 are attached loosely to bracket 50 for later adjustment of the tension on belt 18.

The bearing 35 of the left shaft 28 of the sweeper brush 26 is fixedly attached to the left end of the cross part of the T-shaped sweeper brush housing 31, and the shaft holder 32 of right shaft 33 is fixedly attached to the right end of the said cross part of said T-shaped sweeper brush housing 31. Shaft 28 is inserted into bearing 35 from inside the brush housing 31, and pulley 36 is installed at the end of said shaft 28. Rubber damper 30 is placed inside recess 51 at the left end of sweeper brush 26, and bearing 29 is installed at the right end of said sweeper brush 26.

The left end of sweeper brush 26 is brought up into the left end of sweeper brush housing 31 to engage the holes in rubber damper 30 with the short pins on the circular end of shaft 28. The right end of sweeper brush 26 is brought up into the brush housing 31 and the hole of bearing 29 is aligned with the threaded hole of shaft holder 32. Shaft 33 is screwed into shaft holder 32 until the unthreaded part of shaft 33 goes wholly into the inside bore of bearing 29, and until there is no more sideplay of brush 26 on its shafts 33 and 28. Lock nut 34 is screwed on shaft 33 to bear tightly against shaft holder 32 preventing shaft 33 from loosening out of bearing 29.

Cleanout door 40 is attached to cover hole 39 on the top side of the tail part of the T-shaped sweeper brush housing 31. The spring is installed to maintain at all times a closed position of door 40.

Roller 45 is attached to tabs 75 at each end of brush housing 31. The flexible strip of thin rubber 70 is attached to the inner side of the rear lip of the sweeper brush housing.

Pin type hinge 41 has its second half attached at the outside end of the bottom wall of the tail part of sweeper brush housing 31.

After bolting shredder 8 tightly to the flange 7, and belt 17 is loosely around pulley 6, the spindle 5 is joined to engine crankshaft 1. Set screw 64 is then tightened. Then engine 62 is lowered down on pedestal 11 with the spindle end going into bearing 10, and the belt 17 in the slot at the top left side of pedestal 11. The engine base adapter 3 is bolted tightly to engine pedestal 11.

The brush housing 31 is positioned in front of the mower housing 14 in such a way that the roller 45 is parallel to the front side of mower housing 14. The tail end of brush housing 31 is brought to penetrate the aperture 12 on engine pedestal 11, and the holes of both halves of hinge 41 are aligned so that its pin can be inserted to join both halves, thereby attaching sweeper brush housing 31 to mower housing 14.

The adjustable left front wheel assembly 76 is installed at the left front side of the mower housing 14, the right front wheel assembly 77 at the right front side of mower housing 14, the left rear wheel assembly at the rear left side,-and the right rear wheel assembly 79 at the rear right side of the mower housing 14.

Then the two-piece mower handle 80 are joined together by bolts and the lower ends bolted to the sides of mower housing 14. All mower cables are installed. The knob handle 60 is attached to the mower handle 30.

Pin 42 of L-shaped lever 43 is positioned inside slot 37 in bracket 38 and the lever 43 is bolted but free to move on bracket 46 on mower deck 14. One bent end of rod 44 is inserted in the other hole of L-shaped lever 43 and prevented from slipping off by a cotter pin. The other end of rod 44 is attached to the knob handle 60 and locked with a cotter pin.

With belt 17 around pulley 6 on spindle 5 and around pulley 15 on the worm, worm gear 52 is bolted to the top of mower housing 14. At this point, belt covers 58 and 59 are installed and bolted to engine pedestal 11.

Belt 18 is installed around pulley 16 and pulley 36 with the back of said belt 18 on idler pulley 49 and the inner side of said belt 18 idler pulley 48. Pulleys 48 and 49 are adjusted so that pulley 48 prevents belt 18 in pulley 49 from slipping off. Sleeve roller 47 is fastened to bracket 50 by its bolt to prevent belt 18 from slipping off from pulley 48.

To adjust tension of belt 18, push knob handle 60 forward until roller 45 on brush housing 31 touches the ground. Loosen the bolts that hold bracket 50 to the side of the mower housing 14 and push bracket 50 upward or downward until belt 18 is taut in pulleys 36, 16, 48, and 49 and tighten the bolts that hold bracket 50 to the mower housing 14.

Partial belt covers 54 and 55 are first joined together by pivot bolt 81. The assembled covers are positioned to cover belt 18 and pulleys 16, 36, 48, and 49. Partial cover 54 is bolted to bracket 68. Partial cover 55 is bolted through its elongated hole 56 to its bracket 72 behind pulley 36 just tight enough to allow cover 55 to move with brush housing 31.

To attach blower 20 and mower blade 22, the whole mower is turned on its side so that the right wheels are on the ground and..the left wheels up in the air. Adapter 19 is installed onto the end of spindle 5. With washer 69 firstly, belleville washer 24 secondly, mower blade 22 thirdly, large flat washer 23 fourthly, and blower 20 fifthly inserted into bolt 25, said bolt 25 is screwed tightly into the threaded center hole at the end of spindle 5 until belleville washer 24 is pressed flat rendering blade 22 and blower 20 immovable.

The mower is turned upright and the grass bag is installed. The vacuum sweeper shredder rotary mower is now ready to perform the functions for which it is designed; that is, the machine can now be used to vacuum, sweep, shred, and cut grass.

Again, with continuing reference to the drawings, the present invention, when used as a vacuum sweeper, must have its brush housing 31 raised by pulling knob 60 back until the brush housing is far above the ground as possible. Belt 18-is now loose in pulleys 16, 36, 48, and 49. The mower may be adjusted to any desired height by adjusting the four wheels. Then engine 62 is started, and when the engine is running, spindle 5 with the attached shredder revolves in bearing 10. Blower 20 and blade 22 which are all attached to spindle 5 also revolve. Pulley 6 in spindle 5 drives pulley 15 which is attached to the worm shaft. The worm gear 52 being a unit, pulley 16 which is attached to the gear shaft revolves with pulleys 15 and 60. Because belt 18 is loose in pulleys 16 and 36, pulley 36 of sweeper brush 26 does not revolve even if pulley 15 and pulley 16 are revolving.

To start vacuum sweeping, knob handle 60 is pushed forward causing rod 44 to move forward making pin 42 on L-shaped lever 43 slide forward in L-shaped slot 37 in bracket 38. This causes the sweeper brush housing 31 to be lowered until roller 45 touches the ground. The vertical part of the L-shaped slot 37 allows the brush housing 31 to move up and down as roller 45 follows the contour of the ground.

With the sweeper brush housing 31 at its downmost position, belt 18 is tight on pulleys 16, 36, 49 and 48. Since pulley 16 is constantly revolving, it causes pulley 36 and sweeper brush 26 to revolve. The bristles 27 of brush 26 stirs the grass under it tearing loose old grass clippings and throwing them up including leaves and other debris into the interior of brush housing 31.

As the engine shaft 1 revolves, shredder 8, blower 20, and mower blade 22, all attached to spindle 5, revolve with it. The revolving shredder 8 and blower 20 cause pressure inside the sweeper brush housing 31 and in the central interior above blower 20 to drop. This constantly low pressure causes the air in front of the sweeper brush to rush into the sweeper brush housing 31 bringing with it leaves and debris and throwing the rubbish against the shredder blades 9 which cut them up into fine pieces.

The cut up pieces of rubbish are blown by the shredder down through hole 73 on plate 67 which is the bottom of pedestal 11, into the central interior of the mower housing above blower 20, and thrown upwardly sideward and tangentially into the upper corner of the mower housing above the circumferentially arranged baffle strips 53 where the debris is whirled at cyclonic velocity, exits out of hole 74 on mower deck, through and out of discharge chute 13, and into the grass bag 61. The bag 61 must not be allowed to fully fill up because rubbish that cannot go into the bag 61 would accumulate in discharge chute 13. A clogged up discharge chute would cause a reduction in air velocity in the tailend of brush housing 31.

In the shredding mode, the sweeper brush housing 31 must be in the down-position and the machine is pushed and slowly advanced into a pile of debris. The rubbish is sucked up into the brush housing 31, through the shredder blades 9 which shred the rubbish and blow the debris through holes 73 on plate 67, into the central interior of the mower above the blower 20 which throws the debris sidewardly upward into the upper corner of the cylindrical wall of the mower housing, exit out of the deck, through the discharge chute 13 and into the grass bag 61.

To cut grass, mower height is set by adjusting the mower wheels. Knob 60 is pulled back making rod 44 pull one end of lever 43 backward causing pin 42 to slide in slot 37 in bracket 38 and raising the front end of the T-shaped sweeper brush housing 31 some distance from the ground. In this raised position of housing 31, belt 18 becomes loose in pulley 36 causing it and brush 26 to stop revolving. But spindle 5 to which shredder 8, blower 20, and mower blade 22 are attached keeps on revolving. The rotating blade cuts the grass and throws the grass clippings against the underside of the baffles 53 and into the upper corner of the mower housing. Both shredder 8 and blower 20 continue to draw air from the front of the sweeper brush housing 31. This air is thrown sidewardly upward by blower 20 into the upper corner of the cylindrical housing and whirled around at a high velocity with the grass clippings thrown up by the mower blade 22. The debris is whirled out of the mower housing through exit hole 74, into the discharge chute 13, and into the grass bag 61.

The foregoing description of the preferred embodiments shows the use of the principal elements of the present invention only in a motor or engine-driven walk behind lawn mower. One or two elements or a combination of two or more can be used in other types of machines other than in a walk behind rotary mower shown in the preceding descriptions. For example, the rotary brush, its housing, and its lifting mechanism, the shredder, blower, rotary blade, and the baffles can be adapted for use in a riding rotary mower for vacuum sweeping, shredding, and mowing larger lawns or fields. It will be apparent to those skilled in the art that changes and other variations are possible in the light of the preceding description.

The present invention has been illustrated and described as embodied in a vacuum sweeper shredder rotary lawn mower. It must be clearly understood that all of the above descriptions are made as illustrative examples and not as a limitation to the spirit and scope of the invention.

What is claimed as new and for which I desire protection by Letters Patent is:

1. A vacuum sweeper shredder rotary mower comprising:
   a) a gasoline engine or electric motor that provides power to simultaneously rotate a shredder, a blower, a grass cutting blade, and a sweeper brush;
   b) a pedestal to raise the engine or motor to provide a shredding chamber;
   c) a spindle which is attached and held rigidly to the crankshaft by a key and a set screw;
   d) a multi-bladed shredder attached to and rotated by said spindle to chop leaves and debris into small pieces;
   e) a grass cutting blade attached to and rotated by said spindle;
   f) a mower housing having a cylindrical part with an open bottom and a centrally located circular opening on the top wall for said pedestal;
   g) a discharge chute securely attached to the right side of said centrally located opening of mower housing;
   h) a grass bag whose inlet communicates with the outlet of said discharge chute to collect shredded leaves and grass clippings;
   i) a sweeper brush housing whose discharge end is hinged to said pedestal;
   j) a worm gear to rotate said sweeper brush;
   k) a rotatable sweeper brush with stiff bristles to force leaves and debris into said sweeper brush housing;
   l) a blower shaped like an inverted truncated cone which is attached to said spindle adjacent to said mower blade;
   m) a rod and lever combination to enable mower operator to raise or lower the front part of said sweeper brush housing;
   n) a number of inclining baffles attached to the interior wall of said mower housing.

2. A vacuum sweeper shredder rotary mower as defined in claim 1, comprising a vertical shaft gasoline engine or electric motor that is securely bolted to the top of said pedestal which pedestal is bolted to said mower housing; said gas engine or motor provides the power to rotate said spindle to which are attached said sweeper brush, shredder, blower, and blade.

3. A vacuum sweeper shredder rotary mower as defined in claim 2, comprising a cylindrical pedestal to provide room or space for a revolving shredder, said pedestal has an aperture to receive the discharge end of said sweeper brush housing, a rectangular window for a V-belt, and further, said pedestal has a bottom with fan-shaped openings and to which is attached a bearing holder.

4. A vacuum sweeper shredder rotary mower as defined in claim 3, comprising a spindle with a V-belt pulley at its top end and a flange right below the pulley for attaching said shredder, and said spindle is attached coaxially to the engine crankshaft.

5. A vacuum sweeper shredder rotary mower as defined in claim 4, comprising a shredder removably attached to said spindle, which shredder is provided with a multiplicity of conically radiating blades uniformly twisted so that said shredder functions like a propeller.

6. A vacuum sweeper shredder rotary mower as defined in claim 5, comprising a blower shaped like an inverted truncated cone having the plane of its bigger diameter coplanar with the plane of the leading ends of said baffles; said blower has a multiplicity of impeller blades sized and shaped to produce maximum power to pull in air from said sweeper brush housing and from said pedestal.

7. A vacuum sweeper shredder rotary mower as defined in claim 6, comprising a mower housing having a cylindrical portion open at the bottom whose top wall has a centrally located opening for said pedestal, further having a second opening to the right of and adjacent to said centrally located opening for said discharge chute; said mower housing has a forward and rearward rectangular continuation to provide attachment means for the front and rear wheels, for the brackets, for belt adjusting pulleys, and for the mower handle.

8. A vacuum sweeper shredder rotary mower as defined in claim 7, comprising a mower blade to whose leading edge near each end is sharpened for cutting grass, and providing means for upwardly deflecting cut vegetation.

9. A vacuum sweeper shredder rotary mower as defined in claim 8, wherein said discharge chute attached to the top wall of said mower housing provides a passageway for debris and grass clippings to flow into said grass bag.

10. A vacuum sweeper shredder rotary mower as defined in claim 9, comprising a T-shaped Sweeper brush housing having a shaft holder attached to its right lateral end, a bearing housing attached to its left lateral end on which bearing and shaft the sweeper brush rotates; said sweeper brush housing is provided a door on the top side of the tail end of said sweeper brush housing for removal of debris; further, said sweeper brush housing has its discharge end hinged to the lower sill of said pedestal aperture to allow up and down motion of the front part of said sweeper brush housing as its roller follows the contour of the ground.

11. A vacuum sweeper shredder rotary mower as defined in claim 10, comprising a cylindrical sweeper brush with a few straight or spiraling rows of stiff bristles; said sweeper brush has a bearing embedded at its right end and a recessed rubber damper at its left end that provides engagement with a shaft which can rotate on a bearing attached to the left lateral end of the said sweeper brush housing; and further, said sweeper brush forces loose leaves and other materials into its discharge end.

12. A vacuum sweeper shredder rotary mower as defined in claim 11, wherein the front end of said sweeper brush housing is raised or lowered by an L-shaped lever whose pin engages the slot of a bracket attached to the side wall of said sweeper brush housing, and said lever turns on its fulcrum when the other end of said lever is pulled back by a rod that is connected to the lever handle that pivots on a bolt through the mower handle.

13. A vacuum sweeper shredder rotary mower as defined in claim 12, comprising a worm gear used in combination with V-belts and pulleys to reduce and transfer rotational power from said engine to said sweeper brush.

14. A vacuum sweeper shredder rotary mower as defined in claim 7, comprising a number of baffles of certain width and arc length fixedly attached around the inside surface of the cylindrical wall of said mower housing mainly for the purpose of preventing air and debris from being blown downward, under, and out of the lower rim of said mower housing; said baffles have their leading ends in a plane an inch or more below the top wall of the mower housing, and coplanar with the top of said truncated conically shaped plate to which the impeller blades are attached; the trailing ends of the baffles are in a plane lower than the plane of the leading ends giving each baffle an angle of inclination; and the trailing end of a baffle and the leading end of the next or following baffle are at a certain horizontal and a certain vertical distance from each other, giving enough space for the grass clippings to pass into the upper corner of said mowing chamber above said baffles.

15. A vacuum sweeper shredder rotary mower as defined in claim 14, comprising a grass bag which can be partly or wholly made of porous or non-porous material and which receives the shredded debris from said discharge chute.

* * * * *